United States Patent
Kong

(10) Patent No.: US 8,287,814 B2
(45) Date of Patent: Oct. 16, 2012

(54) CHEMICAL REACTOR FOR CONVERTING A FIRST MATERIAL INTO A SECOND MATERIAL

(75) Inventor: Peter C. Kong, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 1287 days.

(21) Appl. No.: 12/028,550

(22) Filed: Feb. 8, 2008

(65) Prior Publication Data

US 2011/0236272 A1    Sep. 29, 2011

Related U.S. Application Data

(62) Division of application No. 10/992,498, filed on Nov. 17, 2004, now Pat. No. 7,354,561.

(51) Int. Cl.
*B01J 19/08* (2006.01)
(52) U.S. Cl. .................................................. 422/186.21
(58) Field of Classification Search .............. 422/186.21
See application file for complete search history.

(56) References Cited

U.S. PATENT DOCUMENTS

| | | | |
|---|---|---|---|
| 3,123,464 A | 3/1964 | Casey et al. | |
| 3,211,548 A | 10/1965 | Scheller et al. | |
| 3,246,115 A * | 4/1966 | Johnson | 219/121.11 |
| 3,429,691 A | 2/1969 | McLaughlin | |
| 3,630,718 A | 3/1969 | Newenschwander | |
| 3,738,824 A | 6/1973 | Davis et al. | |
| 3,742,350 A | 6/1973 | White | |
| 3,814,616 A | 6/1974 | Kondo et al. | |
| 3,840,750 A | 10/1974 | Davis et al. | |
| 3,914,573 A | 10/1975 | Muehlberger | |
| 3,954,954 A | 5/1976 | Davis et al. | |
| 3,992,193 A | 11/1976 | Fey et al. | |
| 4,022,872 A | 5/1977 | Carson et al. | |
| 4,080,194 A | 3/1978 | Fey | |
| 4,107,445 A | 8/1978 | Wolf et al. | |
| 4,145,403 A | 3/1979 | Fey et al. | |
| 4,146,389 A | 3/1979 | Karlovitz | |
| 4,164,553 A | 8/1979 | Perugini et al. | |
| 4,182,746 A | 1/1980 | Myint | |
| 4,335,080 A | 6/1982 | Davis et al. | |

(Continued)

FOREIGN PATENT DOCUMENTS

DE    1142159    7/1960

(Continued)

OTHER PUBLICATIONS

Down, M. G., "Titanium Production by a Plasma Process". Final Technical Report, Materials Laboratory, Air Force Wright Aeronautical Laboratories (#AD A 121892) May 1982, pp. 1-8.

(Continued)

*Primary Examiner* — Kishor Mayekar
(74) *Attorney, Agent, or Firm* — Holland & Hart LLP

(57) ABSTRACT

A chemical reactor and method for converting a first material into a second material is disclosed and wherein the chemical reactor is provided with a feed stream of a first material which is to be converted into a second material; and wherein the first material is combusted in the chemical reactor to produce a combustion flame, and a resulting gas; and an electrical arc is provided which is passed through or superimposed upon the combustion flame and the resulting gas to facilitate the production of the second material.

11 Claims, 3 Drawing Sheets

U.S. PATENT DOCUMENTS

| | | |
|---|---|---|
| 4,347,060 A | 8/1982 | Blizzard et al. |
| 4,356,029 A | 10/1982 | Down et al. |
| 4,410,358 A | 10/1983 | Heshmatpour |
| 4,420,251 A | 12/1983 | James et al. |
| 4,472,621 A | 9/1984 | Blackmore |
| 4,529,974 A | 7/1985 | Tanaka et al. |
| 4,561,883 A | 12/1985 | Mullner et al. |
| 4,610,718 A | 9/1986 | Araya et al. |
| 4,612,045 A | 9/1986 | Shintaku |
| 4,677,371 A | 6/1987 | Imaizumi |
| 4,731,111 A | 3/1988 | Kopatz et al. |
| 4,736,157 A | 4/1988 | Betker et al. |
| 4,762,756 A | 8/1988 | Bergmann et al. |
| 4,772,315 A | 9/1988 | Johnson et al. |
| 4,783,216 A | 11/1988 | Kemp et al. |
| 4,801,435 A | 1/1989 | Tylko |
| 4,844,437 A | 7/1989 | Heck et al. |
| 4,851,262 A | 7/1989 | McFeaters |
| 4,875,810 A | 10/1989 | Chiba et al. |
| 4,891,066 A | 1/1990 | Shimotori et al. |
| 4,909,914 A | 3/1990 | Chiba et al. |
| 4,911,805 A | 3/1990 | Ando et al. |
| 4,926,165 A | 5/1990 | Lahlouh et al. |
| 5,015,958 A | 5/1991 | Masia et al. |
| 5,017,196 A | 5/1991 | Dewitz |
| 5,017,754 A | 5/1991 | Drouet et al. |
| 5,028,417 A | 7/1991 | Bhat et al. |
| 5,062,936 A | 11/1991 | Beaty et al. |
| 5,073,193 A | 12/1991 | Chaklader et al. |
| 3,051,639 A | 8/1992 | Anderson |
| 5,194,128 A | 3/1993 | Beaty et al. |
| 5,195,046 A | 3/1993 | Gerardi et al. |
| 5,215,749 A | 6/1993 | Nicall et al. |
| 5,257,500 A | 11/1993 | Venkataramani et al. |
| 5,279,148 A | 1/1994 | Brandes |
| 5,294,242 A | 3/1994 | Zurecki et al. |
| 5,369,366 A | 11/1994 | Piesinger |
| 5,401,464 A | 3/1995 | Lillybeck |
| 5,410,255 A | 4/1995 | Bailey |
| 5,416,280 A | 5/1995 | McDermott et al. |
| 5,486,313 A | 1/1996 | De Jong et al. |
| 5,538,706 A | 7/1996 | Kapoor et al. |
| 5,551,484 A | 9/1996 | Charboneau |
| 5,582,927 A | 12/1996 | Andricacos et al. |
| 5,602,492 A | 2/1997 | Cresswell et al. |
| 5,698,177 A | 12/1997 | Pratsinis et al. |
| 5,723,505 A | 3/1998 | Chaumette et al. |
| 5,733,941 A | 3/1998 | Waycuilis |
| 5,743,299 A | 4/1998 | Chick et al. |
| 5,749,937 A | 5/1998 | Detering et al. |
| 5,788,738 A | 8/1998 | Pirzada |
| 5,788,739 A | 8/1998 | Pizada et al. |
| 5,851,507 A | 12/1998 | Pirzada et al. |
| 5,861,441 A | 1/1999 | Waycuilis |
| 5,861,600 A | 1/1999 | Jensen |
| 5,883,138 A | 3/1999 | Hershkowitz et al. |
| 5,886,056 A | 3/1999 | Hershkowitz et al. |
| 5,935,293 A | 8/1999 | Detering et al. |
| 5,984,997 A | 11/1999 | Bickmore et al. |
| 6,085,413 A | 7/2000 | Klassen et al. |
| 6,130,399 A | 10/2000 | Lu et al. |
| 6,187,226 B1 | 2/2001 | Detering et al. |
| 6,194,890 B1 | 2/2001 | Doyle et al. |
| 6,320,400 B1 | 11/2001 | Black et al. |
| 6,372,156 B1 | 4/2002 | Kong et al. |
| 6,379,419 B1 | 4/2002 | Celik et al. |
| 6,395,197 B1 | 5/2002 | Detering et al. |
| 6,408,164 B1 | 6/2002 | Lazaris-Brunner et al. |
| RE37,853 E | 9/2002 | Detering et al. |
| 6,501,278 B1 | 12/2002 | Arabi |
| 6,670,444 B2 | 12/2003 | Amendola et al. |
| 7,232,975 B2 | 6/2007 | Kong et al. |
| 7,354,561 B2 | 4/2008 | Kong |
| 2005/0022935 A1 | 2/2005 | Blalock et al. |
| 2005/0150164 A1 | 7/2005 | Wooten et al. |
| 2006/0078486 A1 | 4/2006 | Chin et al. |
| 2007/0235419 A1 | 10/2007 | Kong et al. |

FOREIGN PATENT DOCUMENTS

| | | |
|---|---|---|
| DE | 269157 A1 | 12/1987 |
| DE | 293704 A5 | 4/1990 |
| FR | 2341389 | 2/1977 |
| FR | 2603209 | 8/1986 |
| GB | 2217699 A | 11/1989 |
| GB | 2279009 A | 12/1994 |
| JP | S30-7408 | 8/1952 |
| JP | S38-6854 | 5/1963 |
| US | 322960 | 2/1975 |
| US | 223055 | 6/1982 |

OTHER PUBLICATIONS

"The INEL Plasma Research Program" Idaho National Engineering Laboratory (BP422E-R0592-1M-T). May 1992.

"Application of Nonequilibrium Gas-Dynamic Techniques to the Plasma Synthesis of Ceramic Powders", McFeaters, John S. and Moore, John J., In a book titled *Combustion and Plasma Synthesis of High Temperature Materials*, VCH Publications 1990. pp. 431-447.

Krasnov, A.N. et al., "Low Temperature Plasma in Mettalurgy".

Academy of Science of the USSR, Institute of Metallurgy Named After A. A. Baikov. Tsvetkov, J. V., "Low Temperature Plasma in Recovery Processes".

European Search Report, dated Apr. 9, 2003.

PCT International Search Report and Written Opinion of the International Searching Authority for PCT/US10/20469, dated Apr. 12, 2010, 10 pages.

Weigiang Han, Philipp Redlick, Frank Ernst and Manfred Ruhle, "Synthesis of GaN—carbon composite nanotubes and GaN nanorods by arc discharge in nitrogen atmosphere", Applied Physics Letters, vol. 76, No. 5, Jan. 31, 2000.

* cited by examiner

GIBBS FREE ENERGY OF REACTION FOR REACTIONS, (1), (2), (3) AND (4)

| TEMP [K] | $\Delta G_R 1$ | $\Delta G_R 2$ | $\Delta G_R 3$ | $\Delta G_R 4$ |
|---|---|---|---|---|
| 0 | 136.109 | 368.200 | 940.191 | 431.7313 |
| 500 | 215.43 | 331.000 | 1015.73 | 363.6175 |
| 1000 | 279.899 | 257.400 | 1080.457 | 229.3183 |
| 1500 | 335.738 | 168.600 | 1135.696 | 77.5725 |
| 2000 | 387.157 | 81.900 | 1185.344 | -79.9085 |
| 2500 | 392.0095 | -19.900 | 1187.526 | -283.514 |
| 3000 | 409.084 | -109.500 | 1201.203 | -474.122 |
| 3500 | 425.6695 | -189.400 | 1213.771 | -664.494 |
| 4000 | 441.728 | -261.000 | 1225.266 | -854.832 |
| 4500 | 415.4965 | -363.300 | 1193.992 | -1087.09 |
| 5000 | 372.944 | -474.000 | 1145.96 | -1335.49 |
| 5500 | 330.1035 | -574.800 | 1097.237 | -1584.16 |
| 6000 | 286.808 | -668.400 | 1047.675 | -1833.38 |

US 8,287,814 B2

CHEMICAL REACTOR FOR CONVERTING A FIRST MATERIAL INTO A SECOND MATERIAL

CROSS-REFERENCE TO RELATED APPLICATIONS

This Application is a Divisional of U.S. application Ser. No. 10/992,498 filed on Nov. 17, 2004, now U.S. Pat. No. 7,354,561, issued 8 Apr. 2008, entitled A CHEMICAL REACTOR AND METHOD FOR CHEMICALLY CONVERTING A FIRST MATERIAL INTO A SECOND MATERIAL.

GOVERNMENT RIGHTS

The United States Government has certain rights in this invention pursuant to Contract No. DE-AC07-99ID13727, and Contract No. DE-AC07-05ID14517 between the United States Department of Energy and Battelle Energy Alliance, LLC.

TECHNICAL FIELD

The present invention relates to a chemical reactor and method of chemically converting a first material into a second material, and more specifically to a method which superimposes an electrical arc onto a combustion flame to superheat the combustion flame to plasma conditions to facilitate the production of the second material.

BACKGROUND OF THE INVENTION

The prior art is replete with numerous examples of devices and other methodology which converts a first material into a second material. For example, the use of a plasma for the conversion of a first material into a second material is found in U.S. Pat. No. 6,372,156, the teachings of which are incorporated by reference herein. It is well known from this, and other references that plasmas are useful for causing materials to undergo a chemical conversion that would typically not normally occur, or that would occur very slowly if the materials that were chemically reacted were presented in some form other than in a plasma state.

As will be recognized, the creation of a plasma is very electrically energy intensive endeavor. Consequently, the use of plasmas in the production of various materials in commercial quantities is somewhat restricted in view of the costs attendant to purchasing the electricity and equipment necessary to produce the plasma and the other equipment to produce the product of interest.

In certain chemical processes, chemical flame burners are employed to combust a first material for purposes of reacting it with another material in order to produce a resulting compound. The conventional flame burners, which are utilized in the industry, consume a significant amount of fuel, and air, to maintain the high operational temperatures that are necessary for these chemical reactions to occur. In an industrial setting, the burners and confinement chambers utilized with these assemblies tend to be rather large, and costly, and take up a significant amount of floor space in any industrial building. Still further, when comparing the relative costs of fabricating a chemical flame burner to a plasma gas heater, for example, it is usually agreed that the chemical flame burner will usually be less expensive to fabricate and to operate.

Therefore, a method for chemically converting a first material into a second material which addresses the shortcomings attendant with the prior art practices is the subject of the present application.

SUMMARY OF THE INVENTION

A first aspect of the present invention relates to a method for chemically converting a first material into a second material and which includes providing a feed stream of a first material which is to be converted into a second material; combusting the first material to produce a combustion flame, and a resulting gas; and passing an electrical arc through the combustion flame and resulting gas to facilitate the production of the second material.

Another aspect of the present invention relates to a method for chemically converting a first material into a second material and which includes combusting a first material to produce a chemical flame which has a major dimension; and passing an electrical arc through the combustion flame to create a plasma which extends along the major dimension of the flame and which facilitates the production of a second material.

Another aspect of the present invention relates to a method for chemically converting a first material into a second material and which includes providing a feed stream of a first material; providing a chemical torch, and combusting the first material in the chemical torch to produce a chemical flame; providing a first electrode which is positioned adjacent to the chemical torch, and the chemical flame; providing a second electrode which is positioned in spaced relation, and downstream of the first electrode, and which is further located adjacent to the chemical flame; providing a source of electricity coupled to the respective first and second electrodes, and wherein the source of electricity produces an electrical arc which passes through the chemical flame, and which facilitates a chemical reaction of the first material to produce a second material; and collecting the second material produced by the chemical reaction of the first material at a location downstream of the second electrode.

Yet another aspect of the present invention relates to a chemical reactor, and which includes a combustion assembly for receiving, and combusting a first material to produce a combustion flame; a chemical reactor positioned adjacent to the combustion assembly, and which receives the combustion flame; and an electrical arc which passes through the combustion flame to create a high temperature plasma, and wherein the plasma is formed in a fashion so as to increase the residency time of the combustion flame within the plasma, and to facilitate the chemical reaction of the first material into a second material.

Still further, another aspect of the present invention relates to a chemical reactor and which includes a source of a first material which is to be converted into a second material; a chemical torch which is coupled in fluid flowing relation relative to the source of the first material, and which combusts the first material to produce a chemical flame; a chemical reactor positioned adjacent to the chemical torch and which defines a passageway that receives the chemical flame, and wherein the chemical reactor is electrically insulated from the chemical torch; a first electrode borne by the chemical reactor, and which is positioned downstream, and at a first distance from the chemical torch; a second electrode borne by the reaction chamber, and which is positioned downstream, and at a second distance from the chemical torch, and wherein the second distance is greater than the first distance, and wherein the second electrode is electrically insulated from the first electrode; a source of electrical power supplied to the first and second electrodes and which generates an electrical arc which passes between the first and second electrodes and through the chemical flame which is passing through the reaction zone, and wherein the electrical arc facilitates the formation of a high temperature plasma which promotes the chemical reaction of the first material to produce a second material; and a collection chamber positioned downstream, and at a third distance from the chemical torch, and wherein the third distance is greater than the second distance, and wherein the collection chamber receives, at least in part, the chemical flame, and which further collects the second material, and wherein the second electrode is electrically insulated from the collection chamber.

These and other aspects of the present invention will be discussed in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
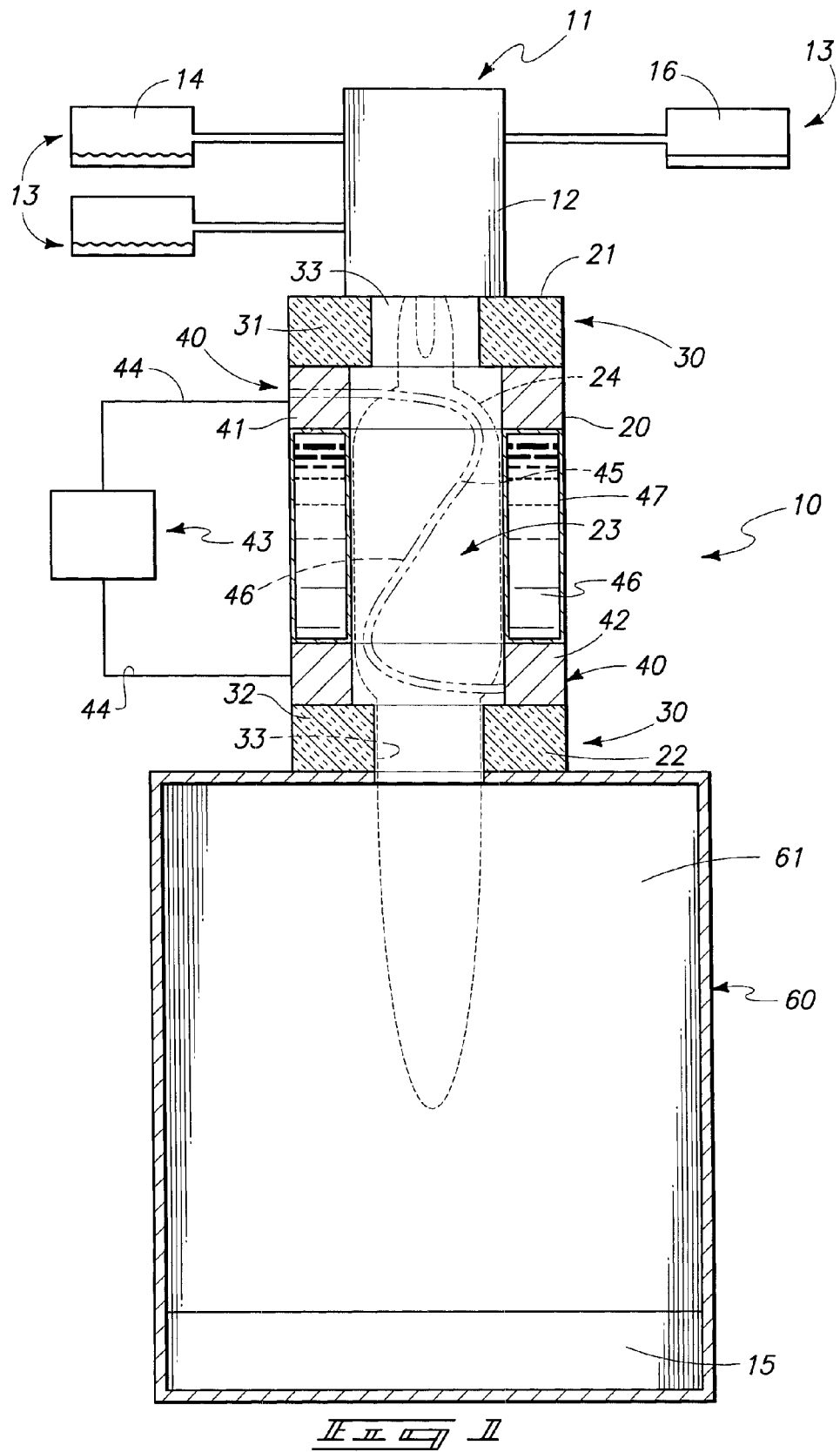
FIG. 1 is a greatly simplified longitudinal, vertical, sectional view of a chemical reactor which utilizes the methodology and achieves the benefits of the present invention.

A chemical reactor which is useful in implementing the methodology for chemically converting a first material into a second material is identified by the numeral 10 in FIG. 1. As seen therein, the chemical reactor includes a chemical flame torch 11 of substantially conventional design. The chemical flame torch has a main body 12 which is coupled in fluid flowing relation relative to a plurality of material sources generally indicated by the numeral 13. As should be appreciated by a study of FIG. 1, the plurality of material sources 13 includes a first material source 14, which is coupled in fluid flowing relation relative to the chemical torch, and which is combusted in the chemical torch and thereafter acted upon by a high temperature plasma in order to produce a second material 15 which is captured or otherwise collected in a collection chamber which will be discussed in greater detail hereinafter. Still further, a source of a third material 16 is coupled in fluid flowing relation relative to the chemical flame torch. The third material is supplied, and combusted, with the first material to produce the second material.

The chemical reactor 10 has a main body 20 as seen in FIG. 1. The chemical reactor has a first end 21 and an opposite second end 22. The chemical reactor defines a passageway 23 which extends from the first end 21, through the second end 22. The passageway has a major, length dimension, and a minor, transverse dimension. The passageway 23, as seen, is operable to receive, at least in part, a chemical flame 24 which is produced by the combustion of the sources of material 13, as discussed hereinafter. The passageway 23 confines the chemical flame 24 and orients it in a given direction. As seen in FIG. 1, the chemical flame torch 11, and the associated chemical reactor 10 are substantially oriented along a vertically oriented axis.

The chemical reactor 10 has opposite electrically insulative ends generally indicated by the numeral 30. In this regard, the electrically insulative ends include a first end plate 31 and opposite second end plate 32. The electrically insulative end plates 31 and 32 electrically isolate the chemical flame torch 11 and the associated collection chamber, which will be discussed in greater detail hereinafter, from the chemical reactor 10. The first and second electrically insulative end plates 31 and 32 each define a passageway therethrough which forms, at least in part, a portion of the passageway 23 and which is discussed, above.

The chemical reactor 10 of the present invention further includes a pair of electrodes which are generally indicated by the numeral 40. In this regard, electrodes include a first electrode 41 which is positioned near the first end 21 of the main body 20, and a second electrode 42 which is posited near the second end 22 of the main body. The respective electrodes are coupled to a source of electricity 43 by means of suitable electrical conduits 44.

In the methodology of the present invention, following the steps of providing the first and second electrodes 41 and 42, the methodology implemented by the chemical reactor 10 includes a step of providing the source of electricity 43, and selectively coupling the source of electricity to the first and second electrodes to generate an electrical arc 45 which extends along the passageway 23, and between the first and second ends 21 and 22, respectively. As should be understood, the step of passing an electrical arc through the combustion or chemical flame 24 has the effect of creating a plasma 46 which extends substantially along the major dimension of the flame as will be discussed below and which facilitates the production of the second material 15. In the arrangement as shown, the first and second electrodes 41 and 42 are positioned a given distance apart. This distance is selected so as to facilitate the chemical reaction of the first material 14 into the second material 15. This selected distance may be 1 inch to several inches, or even more, depending upon the nature of the chemical reaction which is being facilitated by the chemical reactor 10. The distance which is selected, however, is utilized in the present methodology to increase the exposure time of the combustion flame 24, and the resulting gas produced by the chemical flame torch, to the effects of the electrical arc 45 to facilitate the production of the second material 15. Referring still to FIG. 1, it should be understood that the chemical reactor 10 includes an intermediate portion 47 which is positioned between the first and second electrodes 41 and 42 and which defines, at least in part, the passageway 23. This intermediate portion is fabricated from an electrically non-conductive material such as quartz. This intermediate quartz portion or region may be water cooled. As discussed above, the creation of the electrical arc 45 has the effect of creating a high temperature plasma 46 in the chemical reactor 10 and more specifically along the passageway 23.

As seen in FIG. 1, the second end 22 of the main body rests or is otherwise mounted upon a collection chamber which is generally indicated by the numeral 60. The collection chamber defines a cavity 61 which receives the second material 15 which is formed by the conversion of the first material 14 which is combusted by the chemical torch 11 and acted upon by the high temperature plasma 50 to generate the second material 15. As seen in FIG. 1, the collection chamber is positioned downstream from the chemical torch 11 and is operable to receive, at least in part, a portion of the chemical flame 24. As will be recognized, the collection chamber 60 is electrically insulated from the chemical reactor 10 by way of the electrically insulative end plate 32.

Therefore as seen in FIG. 1, a chemical reactor 10 is illustrated and which includes a combustion assembly such as a chemical flame torch 11 and which is operable to receive a first material 14 and combust the first material to produce a resulting chemical or combustion flame 24. Still further, the chemical reactor 10 has a main body 20 which is positioned adjacent to the combustion assembly 11 and which receives the combustion flame 24. Still further, an electrical arc 45 is provided and which passes through the combustion flame 24 to create a high temperature plasma 46. The plasma is formed in a fashion so as to increase the residency time of the combustion flame 26 within the plasma 46 and to facilitate the chemical reaction of the first material 14 into the second material 15. As seen in FIG. 1, the combustion assembly which comprises a chemical torch 11 is mounted adjacent to the chemical reactor main body 20 and is electrically insulated therefrom. Still further, the collection chamber 60 is positioned in downstream fluid flowing relation relative to the chemical reactor 10, and the collection chamber 60 is electrically insulated from the chemical reactor 10. In the arrangement as shown, the chemical reactor 10 has a first end 21, and an opposite second end 22 and a passageway 23, having a length dimension which is defined, at least in part, by the chemical reactor, and further extends from the first end 21 and through the second end 22. The high temperature plasma 46 is created along a preponderance of the length dimension of the passageway 23. Depending upon the nature of the chemical reaction, the electrical arc 45 may be created and which extends over less then a preponderance of the length dimension of the passageway 23. In the chemical reactor as shown, a first electrode 41 is borne by the chemical reactor 10 and positioned in juxtaposed relation relative to the passageway 23. Still further, a second electrode 42 is provided and which is borne by the chemical reactor 10 and positioned in spaced relation relative to the first electrode 41. This second electrode 42 is further juxtaposed relative to the passageway 23. Additionally, a source of electricity 43 is provided and which is selectively electrically coupled to the respective electrodes 41 and 42 and which creates the electrical arc 45 and the resulting high temperature plasma 46. As earlier discussed, the first and second electrodes 41 and 42 are spaced apart at a distance which facilitates the production of the second material 15 from the first material 14. Additionally, from studying FIG. 1, it will be seen that the combustion assembly or chemical flame torch 11, the chemical reactor 10 and the collection chamber 60 are substantially aligned along a substantially vertically oriented axis. This results in the overall assembly having a smaller industrial footprint which will facilitate the usefulness of the assembly in various industrial environments. In the arrangement as shown, the high temperature plasma 46 has a temperature of greater than about 5,000 degrees C. Further, the chemical flame 26, as provided, typically has a temperature of at least about 15% of the temperature of the high temperature plasma 46. In the arrangement as shown, a third material 16 may be further supplied to the chemical flame torch 11, and subsequently reacted with the source of the first material 14 in order to produce the second material 15.

The chemical reactor 10 is effective for practicing the methodology for chemically converting a first material 14 into a second material 15. In this regard, the methodology of the present invention includes a first step of providing a feed stream of a first material 14 which is to be converted into a second material 15, combusting the first material 14 to produce a combustion flame 24, and a resulting gas; and passing an electrical arc 45 through the combustion flame 24, and resulting gas, to facilitate the production of the second material 15. In the methodology as described above, the step of passing the electrical arc 45 through the combustion flame 24, and the resulting gas produces a high temperature plasma 46 which effects the conversion of the first material 14 to the second material 15. In the methodology as shown, a third material 16 may be provided, and which is chemically reacted with the first material 14 to produce the second material 15. In the arrangement as shown, the second material 15 may comprise a borohydride, and the first material may comprise a borate. A typical reaction and related information will be discussed in the example which will be provided hereinafter. In the present methodology, the step of passing the electrical arc 45 through the combustion flame 24 facilitates a substantially one-step chemical reaction to produce the second material 15. Still further in the present method, the step of providing a third material 16 may include providing a source of carbon which may be selected from the group which comprises elemental carbon, methane and other hydrocarbons and which is combined with the first material 14, which may comprise a borate, in order to produce the second material 15 which may comprise a borohydride. As should be appreciated in the present methodology, the first material 14 may comprise more than one compound.

In the methodology of chemically converting the first material 14 into the second material 15, the methodology includes a step of a combusting the first material 14 to produce a chemical flame 24 which has a major dimension; and passing an electrical arc 45 through the combustion flame to create a plasma 46 which extends along the major dimension of the flame and which facilitates the production of a second material 15. In the arrangement as shown, the chemical flame 24 extends, at least in part, into the passageway 23 which is defined by the chemical reactor 10. The passageway 23 confines, at least in part, the chemical flame 24. Still further, and as seen, the electrical arc 45 may extend between the first and second ends 21 and 22 of the main body 20. In the present methodology, the present method further includes the steps of providing a first electrode 41 which is positioned near the first end 21 of the passageway 23; providing a second electrode 42 which is positioned near the second end 22 of the passageway 23; and providing a source of electricity 43 to the first and second electrodes 41 and 42 to generate the electrical arc 45. In the methodology as provided for in the present invention, the method further includes the step of providing a collection chamber 60, and positioning the collection chamber in receiving relation relative to the second end 22 of the passageway 23. The collection chamber 60, as illustrated, is electrically isolated or insulated from the chemical reactor 10. Still further, the present methodology includes a step of cooling a region 47 of the chemical reactor 10 which is located intermediate the first and second ends 21 and 22 of the passageway 23. In the method of the present invention, and as briefly discussed above, the chemical reactor 10 is supplied with a plurality of sources of material 13. In the present method and where the first material 14 comprises borate, and the second material 15 comprises a borohydride, the methodology further includes the step of supplying sources of carbon and hydrogen which are selected from the group which comprises elemental carbon, methane, water and other hydrocarbons, and combusting these same materials with the borate 14 to produce the borohydride 15. As noted earlier, the methodology also includes a step of positioning the first and second electrodes 41 and 42 at a given distance apart which facilitates the chemical reaction of the first material to produce the second material by means of the plasma 46.

In the example which follows, the usefulness of the present chemical reactor 10 and associated methodology will become evident. The present device finds usefulness in the conversion of a first material 14 which may include a sodium borate or sodium metaborate to a second material which includes sodium borohydride. Those skilled in the art will recognize that sodium borohydride has shown promise for storing large amounts of hydrogen that could be selectively released for combustion in internal combustion engines or to power fuel cells and the like. The reaction of sodium borohydride with water results in the formation of sodium borate. To predict the successful reaction of sodium borate to sodium borohydride it is useful to understand the energy requirements for sodium borohydride formation. This energy requirement can be calculated from the enthalpy (or heat of reaction). The Gibbs free energy of reaction can be used to predict thermodynamically favorable reactions. In the reactions noted below, the starting material, which may comprise the first material 14 is sodium metaborate, and each of the four reactions as will be seen below will be considered with respect to the likelihood of sodium borohydride production.

(1)

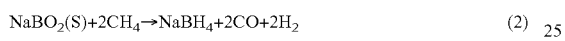

(2)

(3)

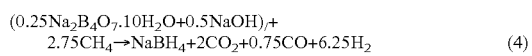

(4)

In order to predict the reactions that are thermodynamically favorable, the Gibbs Free Energy change for the reactions must be calculated. Reactions 1, 2, 3 and 4 are considered for the set of the $\Delta G_R$ above. The Gibbs Free Energy change for reaction 3, above, is considered as to whether this specific reaction is thermodynamically favorable. If this were the case, this would be a very attractive reaction for the production of sodium borohydride by extracting hydrogen from water, this would also have long term implications for carbon sequestration.

Figure 2:
FIG. 2 is a chart which displays the amount of Gibbs free energy of reaction for the chemical reactions identified as 1-4 and which are discussed more fully in the present application.
Figure 3:
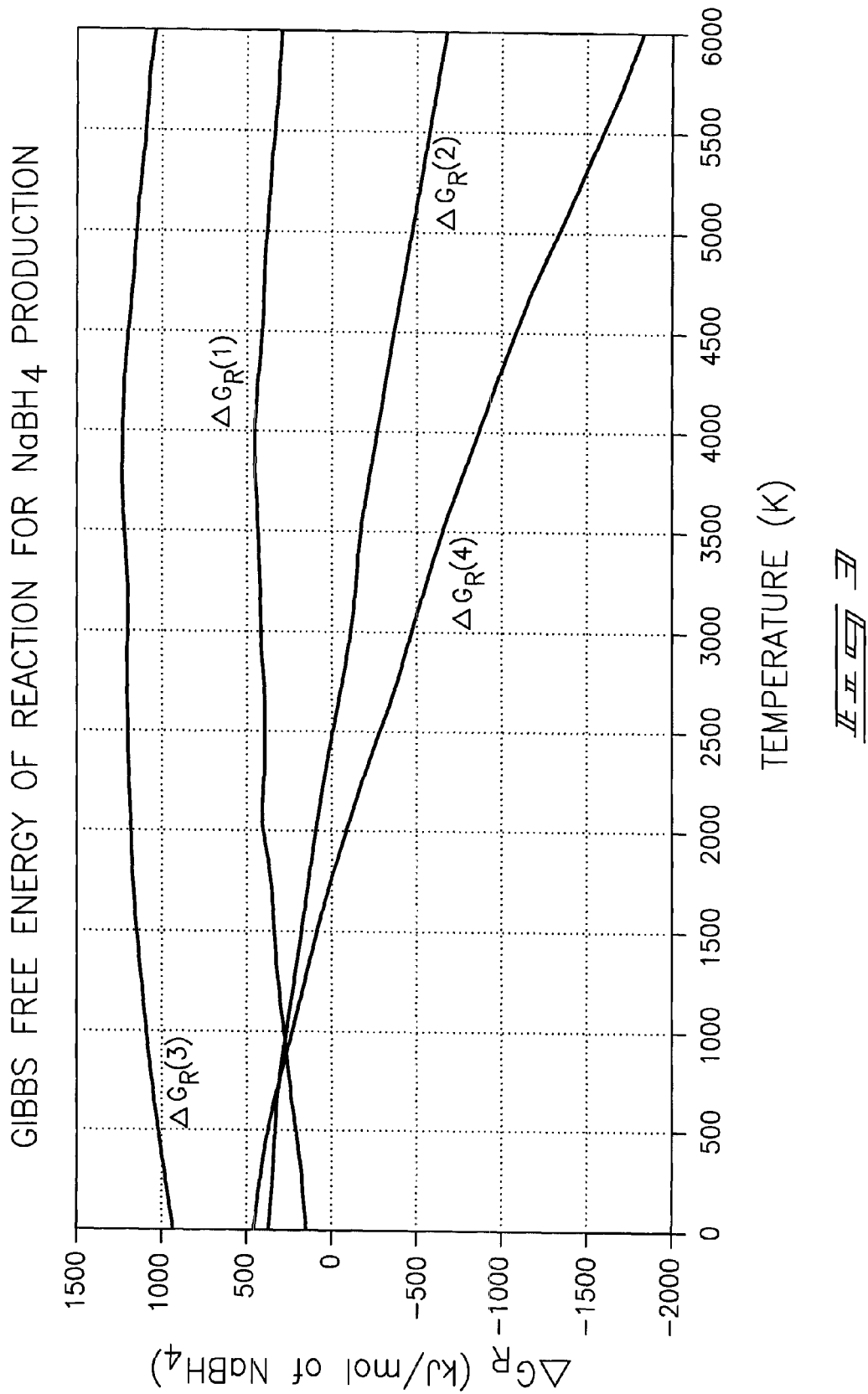
FIG. 3 is graphical depiction of the data as provided in FIG. 2.

Referring now to FIGS. 2 and 3, it should be understood that the data for $NaBH_4$ is not available beyond 2000 K. The Gibbs Free Energy of formation for $NaBH_4$ has been obtained by linear curve fitting of the known data and extrapolation beyond 2000 K. The Gibbs Free Energy change, $\Delta G_R$, for the four equations are tabulated in FIG. 2 and plotted in FIG. 3. The calculations show that reactions 1 and 3 (above) are not thermodynamically favorable. Reactions 2 and 4, on the other hand, are favorable at high temperatures, which are very suitable for thermal plasmas. There is some suggestion that a reducing environment to stabilize the reaction product may also be necessary.

FIGS. 2 and 3 provide information which is derived from the thermodynamic calculations which were conducted for the four equations identified in the paragraphs immediately above. Therefore it will be seen, that reactions (2) and (4) should form sodium borohydride under the conditions utilizing the present methodology.

Therefore, it will be seen that the present invention provides a convenient means whereby a first material can be converted into a second material in a fashion not possible heretofore. Still further, the methodology provides economic cost advantages over the prior art practices which have included, among others, manufacturing costly chemical torch assemblies having relatively large footprints and utilizing plasma systems which utilize increasing amounts of electricity.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A chemical reactor, comprising:
   a combustion assembly for receiving a first material, and combusting the first material to produce a combustion flame;
   a first electrically insulative structure coupled with the combustion assembly;
   a second electrically insulative structure spaced apart from the first electrically insulative structure;
   a reaction chamber including a body having a flow path defined therethrough, the body being positioned between the first electrically insulative structure and the second electrically insulative structure; and
   pair of electrodes disposed between the first and second electrically insulative structures, the pair of electrodes configured to produce an electrical arc which passes through the combustion flame as it flows through the flow path of the body to create a high temperature plasma.

2. A chemical reactor as claimed in claim 1, wherein the combustion assembly comprises a chemical torch.

3. A chemical reactor as claimed in claim 1, further comprising a collection chamber positioned in downstream fluid flowing relation relative to the body, wherein the collection chamber is coupled with the second electrically insulative structure, and wherein the collection chamber is configured to collect a material product produced by the high temperature plasma.

4. A chemical reactor as claimed in claim 3, wherein the combustion assembly, the reaction chamber and the collection chamber are substantially aligned along a substantially vertically oriented axis.

5. A chemical reactor as claimed in claim 3, further comprising:
   a supply of sodium borate coupled with the combustion assembly to provide sodium borate as the first material;
   a source of hydrogen coupled with the combustion assembly.

6. A chemical reactor as claimed in claim 5, wherein source of hydrogen comprises a source of methane.

7. A chemical reactor as claimed in claim 1, further comprising:
   a first material supply coupled with the combustion assembly to provide the first material;
   a second material supply coupled with the combustion assembly to provide a carbon containing material to the combustion assembly.

8. A chemical reactor as claimed in claim 1, wherein the pair of electrodes includes a first electrode and a second electrode positioned in spaced relation relative to the first electrode, and wherein the chemical reactor further comprises a source of electricity which is selectively electrically coupled to the respective electrodes and which creates the electrical arc and the resulting high temperature plasma.

9. A chemical reactor as claimed in claim 8, wherein the body of the reaction chamber is formed of an electrically insulative material.

10. A chemical reactor as claimed in claim 1, wherein the combustion assembly and the pair of electrodes are cooperatively configured to produce the high temperature plasma at a temperature of greater than about 5000 degrees C. with the combustion assembly producing the combustion flame at a temperature of least about 15 percent of the temperature of high temperature plasma.

11. A chemical reactor, comprising:
a first material supply;
a chemical torch which is coupled in fluid flowing relation relative to the first material supply and which is configured to combust material from the first material supply to produce a chemical flame;
a first electrically insulative plate coupled to the chemical torch;
a reaction chamber defined, at least in part, by a body positioned downstream from the chemical torch, the body defining a passageway through which the chemical flame is directed;
a first electrode positioned between the first electrically insulative plate and the body;
a second electrode separated from the first electrode by the body of the reaction chamber;
a collection chamber positioned downstream of the body, wherein the collection chamber receives, at least in part, the chemical flame, and wherein the second electrode is electrically insulated from the collection chamber;
a second electrically insulative plate positioned between the second electrode and the collection chamber; and
a source of electrical power supplied to the first and second electrodes configured to generate an electrical arc which passes between the first and second electrodes and through the chemical flame as it passes through the passageway of the body.

* * * * *